United States Patent [19]

Hunziker

[11] Patent Number: 5,762,689
[45] Date of Patent: Jun. 9, 1998

[54] METHOD AND DEVICE FOR CLEANING DUST-LADEN AIR

[76] Inventor: Werner Hunziker, Im Köpfli 262, CH-5054, Kirchleerau, Switzerland

[21] Appl. No.: 680,300

[22] Filed: Jul. 12, 1996

[30] Foreign Application Priority Data

Jul. 21, 1995 [CH] Switzerland .............. 2147/95

[51] Int. Cl.$^6$ .................................. B01D 46/04
[52] U.S. Cl. .................. 95/280; 55/283; 55/302; 55/351
[58] Field of Search ............ 55/283, 290, 291, 55/293, 302, 351, 352; 95/279, 280

[56] References Cited

U.S. PATENT DOCUMENTS

| | | | |
|---|---|---|---|
| 2,400,217 | 5/1946 | White | 55/283 |
| 2,484,491 | 10/1949 | Daugherty | 55/351 |
| 2,827,128 | 3/1958 | Hersey, Jr. | 55/283 |
| 4,253,855 | 3/1981 | Jackson et al. | |
| 4,377,401 | 3/1983 | Laughlin | |
| 4,826,512 | 5/1989 | Fuller | |
| 5,180,407 | 1/1993 | Demarco | 55/302 |

FOREIGN PATENT DOCUMENTS

| | | |
|---|---|---|
| 0594216 | 4/1994 | European Pat. Off. |
| 2355044 | 5/1975 | Germany |
| 9404522 | 7/1994 | Germany |
| 660980 | 6/1987 | Switzerland |

Primary Examiner—Jay H. Woo
Assistant Examiner—Minh-chau T. Pham
Attorney, Agent, or Firm—Martin A. Farber

[57] ABSTRACT

The dust-laden air is led along a flow path through a porous filter wall (7) into a vacuum atmosphere (4') and from there, as clean air, over an acceleration stage (24) and discharged from the flow path. In order to equalize the resistance to flow in the flow path, the filter wall (7) is periodically cleaned with force pulses. In this connection, it is acted on, in time sequence, only section-wise by force pulses, namely when the filter-wall sections are in a position directed transverse to the vertical during the action of the pulses or are then brought into such a position. In this position, the dust-laden atmosphere lies—seen in the direction of flow—below the filter-wall section (7) and the vacuum atmosphere (4') lies above it.

21 Claims, 3 Drawing Sheets

METHOD AND DEVICE FOR CLEANING DUST-LADEN AIR

FIELD AND BACKGROUND OF THE INVENTION

The present invention relates to a method and a device for cleaning dust-laden air.

In smaller dust-removal devices, it is known to use cartridge filters consisting of nonwoven material. Due to the undulated or zig-zag arrangement of the filter material large filter surfaces can be obtained in a small space. Depending on the required output, a dust-removal device is provided with one or more filter cartridges. These devices have a dust-laden air chamber into which the filter cartridges extend, as well as a cleaned-air chamber which is connected with the inside of the filter cartridge. A blower adjoins the cleaned-air chamber. The blower is integrated in smaller units while in larger units it is set up separately or is attached.

The filter cartridges are as a rule installed vertically. Their open end faces upward. The periodic cleaning-off of the dust adhering to the filter cartridge is effected as a rule by a short, very strong blast of air from an air container built onto the device or integrated in it. The blast of air comes from a blast nozzle through an injector, entraining the surrounding air with it. The cleaning in these devices is effected either by the pressure produced in the filter cartridge or by very strong turbulences produced by the incoming air and the vibrations connected therewith.

Another device is known from CH-A-660980. In that case also, air is blown into the cartridge from a charged compressed-air container. During the cleaning process, the cartridge is automatically closed and the cleaning is effected predominantly by the pressure produced in the cartridge and not by vibrations, which are substantially suppressed. Studies have shown that the avoiding of vibrations in the region of the filter medium is an essential requirement for an optimal filter action.

Both of the two devices mentioned have the essential disadvantage that the cleaning action becomes poorer and poorer with the passage of time and that, after a certain period of time, it is necessary to remove the cartridges and clean them thoroughly. This is due to the fact that, on the one hand, a substantial amount of dust is produced upon the cleaning of the filter cakes and, on the other hand, the cleaning is in any event more effective in the upper part of the cartridge and furthermore a part of the dust which is blown off on top is immediately drawn-in again somewhat further downward or on neighboring cartridges. This has the result that cleaning must be effected at short intervals, with a correspondingly high consumption of compressed air.

The condition is similar with horizontally or obliquely installed cartridges; while the lower side of the cartridge is in a favorable position and is cleaned well, it is, however, impossible, with feasible means, to blow the dust out of the folded filter material on the upper side. After a certain period of time, only the lower half is still effective, with a corresponding reduction in the filter performance.

SUMMARY OF THE INVENTION

The object of the present invention is so to improve a device of the aforementioned type that it assures constant good filter performance with little development of noise and little expenditure of energy, and that it can be produced at such a favorable cost that it is suitable as a module with which large installations can be produced by simple multiplication.

One advantage of the invention is that, differing from all known devices, the entire filter surface can be excellently maintained under inspection and controlled. In the known air-shock cleaning through the air-outlet opening a uniform state of the adherent layer of dust over the entire surface of the filter cannot be obtained. The invention come close to the ideal concept of always removing only so much of the dust coating on the filter surface as is necessary in order to maintain the rated output constant, which results in a substantially better quality of the cleaned air.

Due to the invention, furthermore, an optimal damping of the noise can be obtained, while the required damping measures are extremely simple and economical. Noise levels can be obtained which can otherwise be obtained only with expensive measures.

BRIEF DESCRIPTION OF THE DRAWINGS

With the above and other objects and other advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
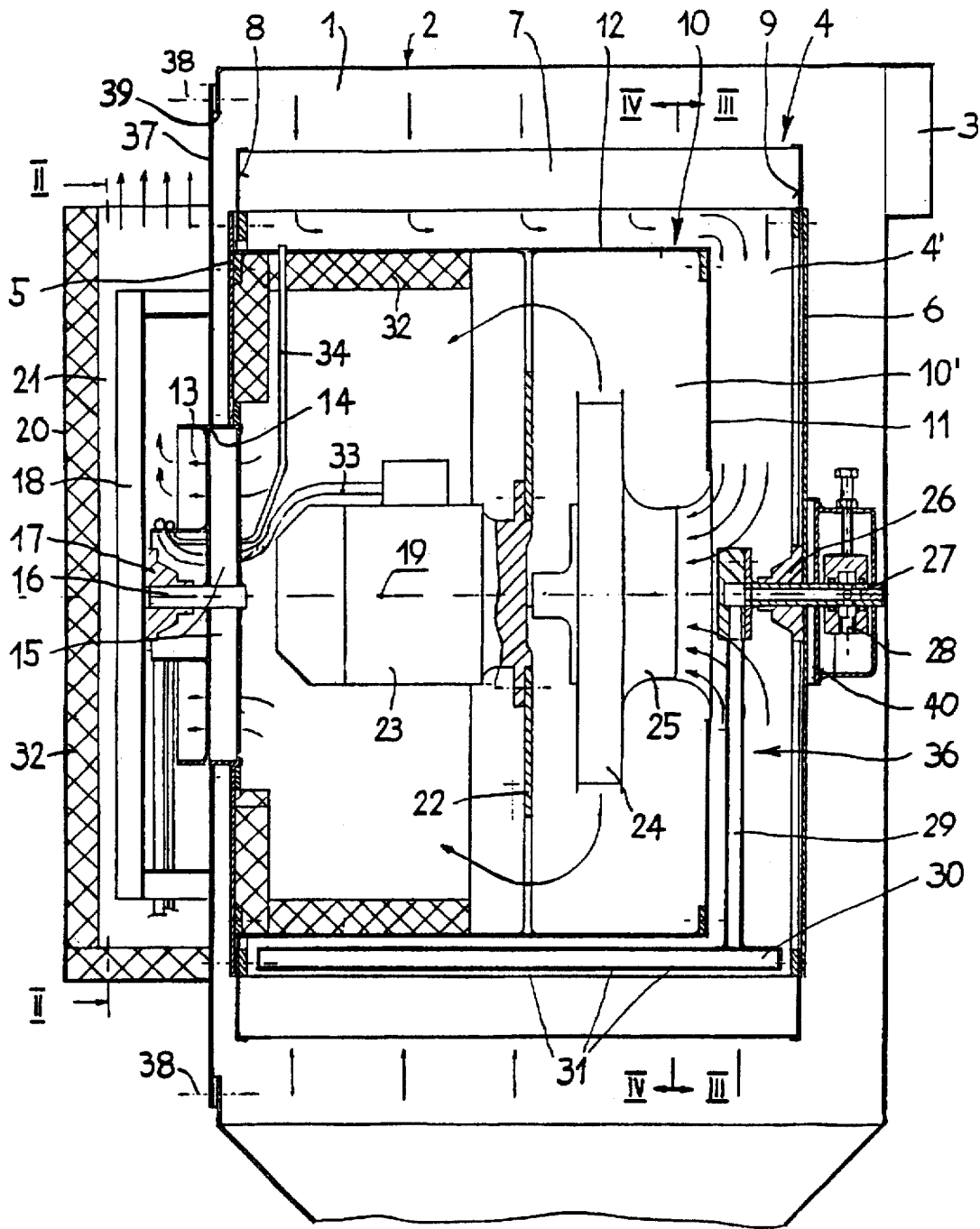
FIG. 1 is a vertical section through a device.
Figure 2:
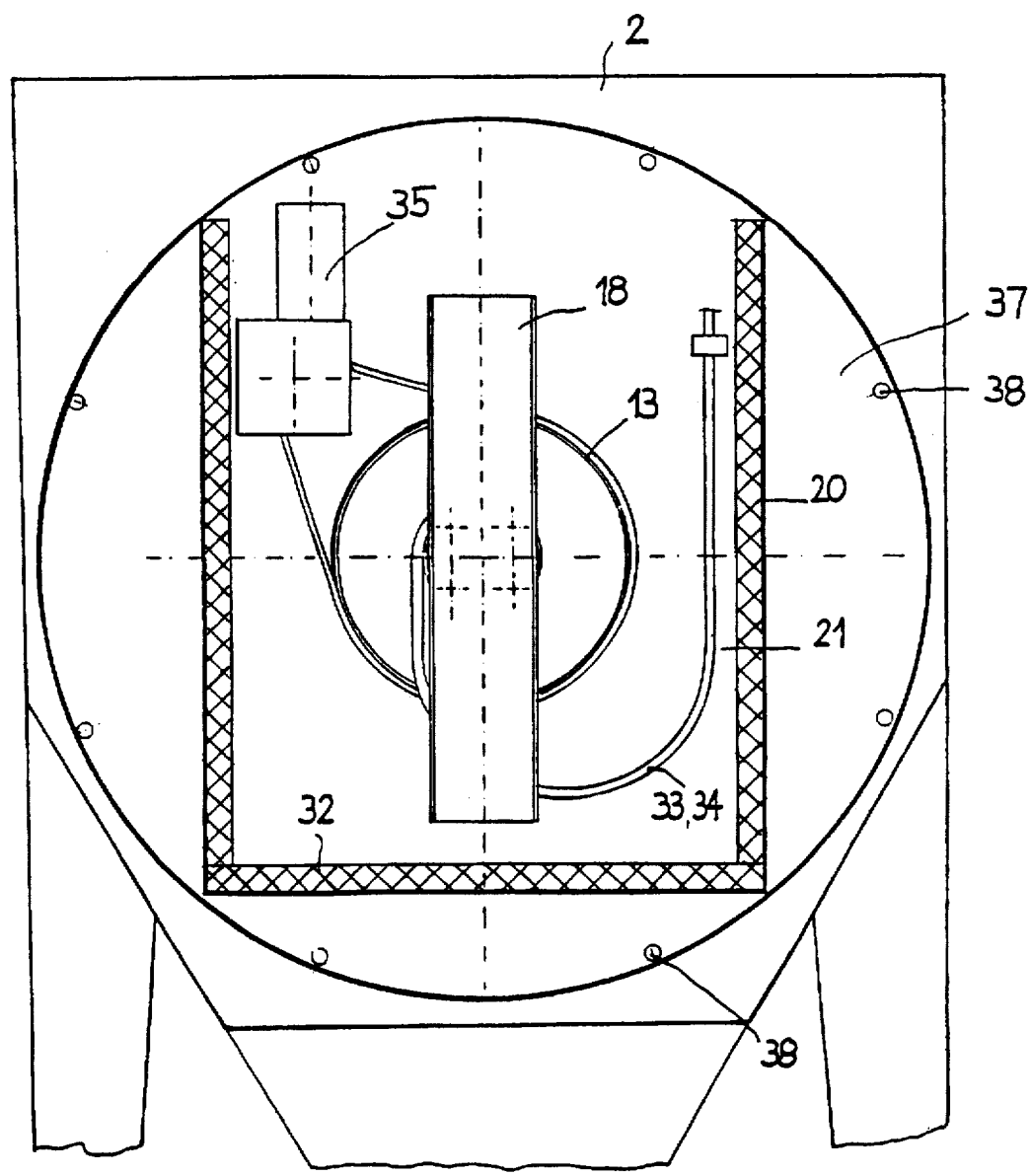
FIG. 2 is a section along the line II—II of FIG. 1.
Figure 3:
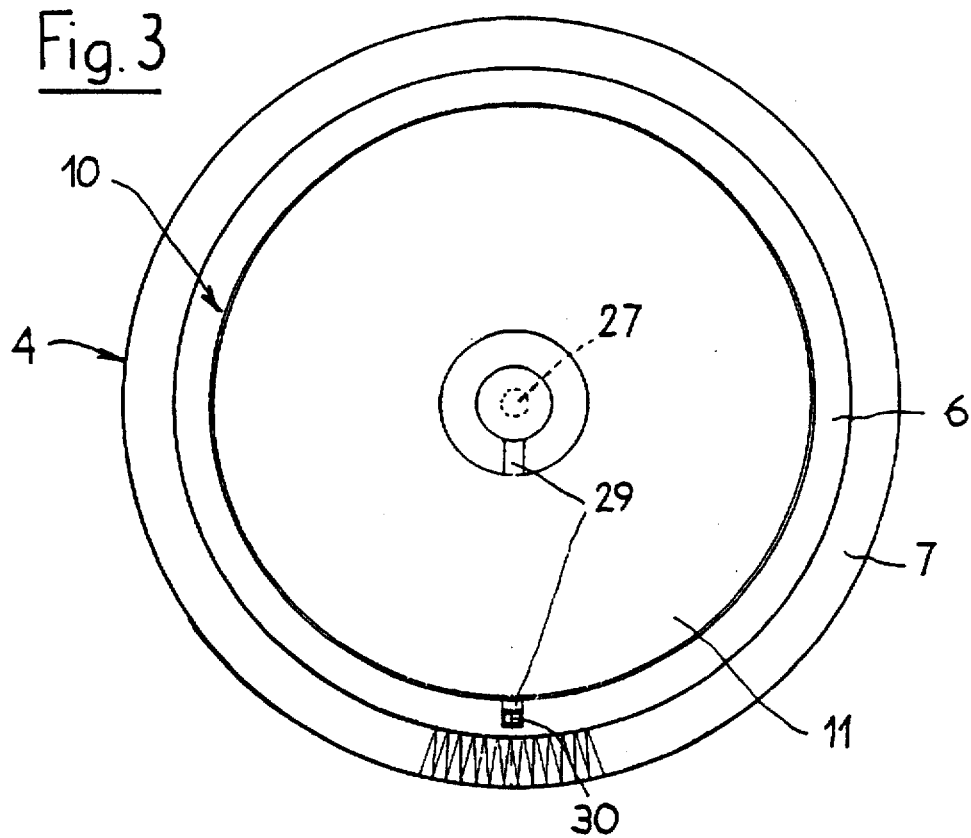
FIGS. 3 and 4 are sections along the lines III—III and IV—IV respectively of FIG. 1, on a somewhat smaller scale.
Figure 4:
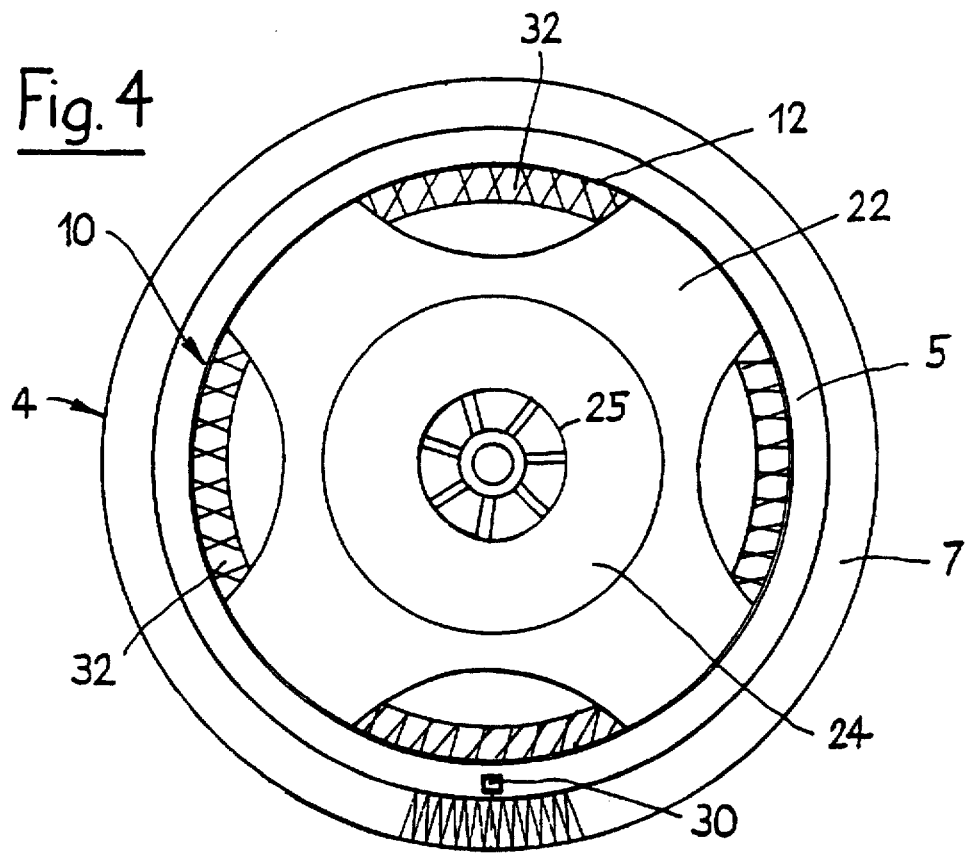

Reference numeral 1 designates a working chamber limited by a housing 2. At the bottom, the housing 2, which contains at least one filtering device, tapers down to an outlet funnel having a dust container (not shown) or a discharge lock. Within the working chamber 1 there may be present, in addition to the filter device, also a machining device which produces a dust atmosphere, such as, for instance, a blast device. If it comprises only one or a few filters, it forms an independent unit which is connected, via a pipe socket 3, to the working chamber of a dust-producing machining machine. The housing 2 or a machining machine connected with it is, as a rule, set up in a workshop and is surrounded by the normal atmosphere customary there.

In the working chamber 1 there is a substantially round drum 4 which defines a vacuum chamber 4' and has a ring-shaped wall 5 as well as a wall 6 in the form of a circular disk, the circumferential wall of the drum consisting of a filter mat folded in zig-zag manner and formed of a fiberlike woven filter material or special paper. On the sides facing each other, each of the two walls 5 and 6, which are coaxial to the axis 19 of the drum, is each provided in its peripheral region with a groove 8, 9, respectively, in which the filter mat is held in form-locked manner and preferably also air-tight by grouting.

Coaxially with the horizontal axis 19 of the drum there is present in the drum 4 a second cylindrical drum 10 which defines a pressure chamber 10' and has a part of the ring-shaped wall 5 in common with the first drum and, parallel thereto, a ring-shaped wall 11 which is fastened by a surrounding wall 12 to the wall 5. On the wall 5 there is axially fastened a pipe socket 13 which passes, with radial clearance, through an opening 14 in a support plate 37 which is fastened by screws 38 to the housing 2 and which closes an opening 39 in the housing 2. The pipe socket 13 thus connects the inside of the second drum 10 to the surrounding atmosphere. Within the pipe socket 13 there is firmly seated a pair of diametrical spokes 15 which holds fast a journal pin 16 which is coaxial to the drum axis 19. The journal pin 16 is rotatably mounted in a bearing 17 which is fastened to a yoke 18 which is firmly attached to the support plate 37.

The yoke 18 is contained within a housing shell 20 which is fastened in the manner of a bay to the support plate 37 and defines a pressure-reduction chamber 21 which is open towards the surrounding atmosphere and screens off the mouth of the pipe socket 13. The drum 10 is divided and stiffened on the inside by a perforated wall 22 oriented transverse to the axis 19 of the drum, on which wall an electric motor 23 is flanged coaxial to the axis 19 of the drum. This motor drives the rotor of a centrifugal blower 24, also fastened to the wall 22. The suction connection 25 of said blower which is coaxial to the fan wheel is connected by a corresponding opening in the wall of the drum 10 to the vacuum chamber 4'. The drum 4 is rotatably mounted by a rotary bearing 26 on a hollow shaft 27 which is coaxial to the axis 19 of the drum. The hollow shaft 27, which is firmly attached by yokes 40 to the support plate 37, can be connected on the one hand, via a connection 28, to a source of blast-air, not shown, and is connected, on the other hand, by a radial length of pipe 29 to a pipe section 30 which lies, parallel to the axis 19 of the drum, between the surrounding walls of the drums 4 and 10. The pipe section 30 which extends over the width of the filter mat 7 is provided with a series of blast openings 31 directed against the filter mat 7 through which the portion of the filter mat 7 opposite them (triangular in cross section) can be acted on by blast air. The hollow shaft 27, the pipe length 29, and the pipe section 30 are parts of a cleaning air line 36 which can be connected with the source of blast air by a controllable valve and which serves for the cleaning of the filter mat 7. The inside of the drum 10 and of the housing shell 20 is lined with acoustic insulating mats 32, which absorb the noise of the blower.

Through the pipe socket 13 there extend the flexible feed lines 33 to the motor 23 and measurement lines 34 for detecting the pressure conditions in the drums 4 and 10. The turning of the drums 4 and 10 by in each case 360° around the axis 19 of the drum is effected by a drive 35 which, by an endless chain or belt, acts on the pipe socket 13. The drive 35 can optionally be driven in either of the two directions of rotation. The drive 35 could also be arranged directly on the shaft 16.

If the motor 23 is connected and the device 15 in operation, the blower 24 draws air through the filter mat 7 out of the working chamber 1, which is not sealed off from the surrounding normal pressure, into the inside of the drum 4. At the transitions from the surrounding temperature into the working chamber and from the latter into the drum 4, a pressure gradient is produced so that, under operating conditions, no dust-laden air emerges from the working chamber 1 into the surrounding atmosphere. Through the suction connection 25, the blower 24 draws the clean air out of the drum 4 and conveys it into the drum 10 within which a pressure which lies above normal atmospheric pressure is built up. From the inside of the drum 10, the clear air, following the pressure gradient, flows through the pipe socket 13 into the pressure-reduction chamber 21 and further into the surrounding normal atmosphere.

As a result of the flow of air produced by the blower 24, the suspended dust of the working chamber 1 is deposited on the outside of the filter mat 7, as a result of which the resistance to flow of the mat increases as the thickness of the layer of dust increases. In order that the flow of air does not stop, and in order to obtain a resistance to flow which is as constant as possible, the filter mat 7 is periodically cleaned with air from the cleaning air line 36, for which purpose the inside of the filter mat 7 is acted on by air from the blast openings 31. For this purpose, the cleaning air is allowed to emerge uniformly out of the blast openings 31, while at the same time the drums 4 and 10 are turned 360° with constant speed by drive 35. The filter mat 7 is, in this connection, moved past the blast openings 31 and the section lying in each case in their field of action (in the form of a triangular pocket as seen in cross section) is freed from the layer of dust adhering to the outside thereof. It is not necessary in this connection to interrupt the filtration. It is essential that the filter mat 7, along its path of movement in or to the field of action of the blast openings 31, pass through a position in which —seen in the direction of fall —the filter mat 7 lies above the layer of dust loosened by the blast air so that the dust which falls off cannot deposit again on a lower point of the filter mat 7.

Corresponding to the load of dust in the dust-laden air atmosphere, an optimal length of time for the cleaning interval is preselected by a time switch. For discontinuing of the cleaning process, the filter resistance, which increases due to the loading by the dust and is detected via the measurement line 34, can also be used by means of a pressure difference switch. The drive 35 slowly turns the drums 4, 10 by 360° and during this time the blast air is connected via an electrovalve. The return to the starting position can take place by a reversal of the drive 35, by a spring retraction, or the like. As a rotary drive 35, an air rotary cylinder would, for instance, be suitable.

It is advantageous for the cleaning air to be pre-pressurized only to a low pressure of 1 to 2 bars gauge and for the time of action to be short. In this way, the loosened compact filter cake is not broken up into dust again and the cost of energy for the cleaning can be kept low. Furthermore the drum 4 can be turned relatively rapidly and the centrifugal force supports the action of the cleaning air. The precisely controllable cleaning process has the further advantage that the variations in the resistance to flow on the filter mat 7 can be kept small.

For turning the drums 4 and 10, the drive 35 can be dispensed with in the case of interrupted operation. Upon interrupted operation the forces of reaction produced upon the starting of the blower 24 can be used for the turning of the drums 4 and 10; i.e. the cleaning of the filter is effected in each case upon the connecting of the blower and the substantially higher motor torque upon the starting of the motor and the inertia of the impeller are sufficient to turn the drums 4 and 10 360° in about 3 to 5 seconds. At the same time, the return into the starting position can be prepared for by the tensioning of a spring or by the lifting of a weight. If the blower 24 has reached the operating speed of rotation, the torsional forces still acting on the drums 4 and 10 are only slight, so that the return can be effected easily via the tensioned spring or the counterweight. During the starting phase, in which the drums 4, 10 turn 360° opposite to the direction of rotation of the blower, the blast air is connected via an electrovalve. The approximately 3 to 5 seconds which are available upon the starting process are sufficient for the cleaning process.

In the example described, the support plate 37 and the yokes 18 and 40 form, so to speak, the rigid chassis of the dust-removal device, designed as structural unit or module. On this chassis all essential elements are mounted, i.e. the drums 4 and 10, the electric motor 23, as well as the blower 24 and the cleaning air line 36, so that the dust-removal device can be prefabricated and flanged as a unit onto a dust-laden air or working chamber. If the dust-removal device is made as a comparatively small module, several such modules can be installed in an operating process of higher filtering performance.

Since the amount of air for the cleaning is slight in the dust-removal device of the invention, the compressed-air containers otherwise necessary can be dispensed with and the device can be connected, with small cross section, directly to an existing compressed-air network.

I claim:

1. A process for cleaning dust-laden air comprising the steps of filtering the dust-laden air by conducting the dust-laden air from an atmosphere of dust-laden air along a flow path through a porous cylindrical filter wall rotatable about a horizontal axis into a vacuum atmosphere and from there as clean air, over an accelerating stage and then discharging the clean air from the flow path, the filter wall enclosing a vacuum chamber containing the vacuum atmosphere, maintaining the pressure in a pressure chamber containing the accelerating stage above normal atmospheric pressure, and the pressure in the vacuum chamber below normal atmospheric pressure without sealing means for said chambers, during said filtering, rotating the filter wall so that different sections of the filter wall in turn become a lowermost section of the filter wall, blowing air in force pulses from a stationary pipe next to and above the then lowermost section of the filter wall in time sequence on the then lowermost section of the filter wall in a vertically radially outward downward direction onto the lowermost section of the filter wall so as to blow out the dust in the then lowermost filter wall section, as said then lowermost filter wall section is in a position directed transverse to the vertical so that, seen in the direction of fall, the dust-laden air lies below the then lowermost filter wall section and the vacuum atmosphere lies above said then lowermost filter wall section.

2. A method according to claim 1, wherein the filter wall sections are brought, in said time sequence, into said position, and providing a pressure atmosphere of higher pressure than that in the atmosphere of dust-laden air.

3. A device for removing dust from an atmosphere of dust-laden air present in a working chamber by filtering, said device forming a flow path leading from the working chamber to normal atmosphere, and comprising in order in said flow path, a horizontally mounted filter wall, a vacuum chamber of lower pressure than that in the working chamber, the filter wall separating the latter therearound from said vacuum chamber therein and the dust-laden air passing radially inwardly through the filter wall during the filtering, an accelerator, and a pressure chamber having a higher pressure than that in the vacuum chamber, a stationary, horizontally disposed filter-cleaning air line which is disposed outside of the pressure chamber and in the vacuum chamber above and adjacent a lowermost section of said filter wall, the filter wall, the vacuum chamber, the accelerator, and the pressure chamber are assembled to form a structural unit without sealing means, the structural unit has at least one bearing member rotatably mounting the structural unit about a horizontal axis of rotation around which the filter wall is turnable relative to the cleaning air line, said cleaning air line constitutes means for blowing air in a vertically radially downward direction against the lowermost section of the filter wall for vertically radially outwardly downwardly blowing-out the dust from the filter wall effecting cleaning removal of the dust therefrom while said filtering of the dust from the dust-laden air continues radially inwardly through a remainder of said filter wall without blown-out removed dust filtering again onto the filter wall, and the flow path from the pressure chamber is defined by a section, and wherein the filter wall, the vacuum chamber, the accelerator, the pressure chamber, and said section defining the flow path are arranged coaxial to the axis of rotation, said pressure chamber is disposed axially in the vacuum chamber in the flow path downstream of the filter wall, the accelerator being disposed axially in the pressure chamber, and the accelerator being at least partially disposed within the vacuum chamber.

4. A device according to claim 3, wherein the accelerator and the pressure chamber are arranged coaxially in a common drum-shaped housing, which is mounted axially in another housing, also of drum shape, the latter housing defines the vacuum chamber and is firmly attached to said common drum-shaped housing.

5. A device according to claim 4, wherein said another housing is supported for rotation about said axis of rotation by means of the bearing member.

6. A device according to claim 4, wherein the filter wall forms a wall of said another housing concentrically surrounding the axis of rotation.

7. A device according to claim 6, wherein the filter wall is provided with a zig-zag folding.

8. A device according to claim 3, further comprising an electric motor, wherein the accelerator is driven by the electric motor, and said motor is disposed coaxial to the axis of rotation.

9. A device according to claim 8, wherein the electric motor is disposed, at least, partially within the pressure chamber.

10. A device according to claim 3, wherein the vacuum chamber is supported on opposite sides in the bearing member and a part of the bearing member is arranged in said section defining the flow path and forming a flow channel.

11. A device according to claim 3, wherein the cleaning air line has a portion which is conducted coaxial to the axis of rotation of the structural unit into the vacuum chamber.

12. A device according to claim 11, wherein the cleaning air line has a branch which is parallel to the axis of rotation and has a row of blast nozzles directed against toward the lowermost section of the filter wall.

13. A device according to claim 11, wherein a part of the bearing member has a hollow profile and forms said portion of the cleaning air line.

14. A machine comprising the working chamber at least partially defining the dust-laden air atmosphere and having a device according to claim 3 which forms said flow path leading from the working chamber to a surrounding said normal atmosphere, and wherein the flow path extends through said section of the flow path into the surrounding normal atmosphere.

15. A machine according to claim 14, wherein the working chamber has a part of the bearing member.

16. A machine according to claim 14, further comprising a housing of the working chamber, and wherein said section defining the flow path is a pipe socket which is coaxial to the axis of rotation and passes through the housing of the working chamber.

17. A machine according to claim 16, further comprising a pressure-reduction chamber, and wherein the pipe socket discharges into said pressure-reduction chamber, the latter being open to the normal atmosphere; and the pressure chamber and the pressure-reduction chamber are lined with a sound-insulating material.

18. A machine according to claim 16, wherein the pipe socket is part of the structural unit and is firmly attached to said structural unit.

19. A machine according to claim 16, further comprising a pressure-reduction chamber which is open to the normal atmosphere, and said pipe socket discharges into pressure-reduction chamber.

20. The device according to claim 3, wherein the accelerator is a blower.

21. The device according to claim 3, wherein said pressure chamber is mounted inside said vacuum chamber forming an integral structural unit therewith without sealing means, and said pressure chamber has a cylindrical wall concentric to and spaced radially inwardly from said filter wall and has an axial opening communicating with said vacuum chamber, a suction side of said accelerator is disposed in said opening, and said cleaning air line extends spaced from and between said cylindrical wall and said filter wall, and wherein the blowing air is pressurized to a low pressure of about 1 to 2 bars gauge with a short time of blowing air.

\* \* \* \* \*